(12) United States Patent
Ikeda

(10) Patent No.: US 12,307,757 B2
(45) Date of Patent: May 20, 2025

(54) RECOGNITION ERROR CORRECTION DEVICE AND CORRECTION MODEL

(71) Applicant: NTT DOCOMO, INC., Chiyoda-ku (JP)

(72) Inventor: Taishi Ikeda, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 864 days.

(21) Appl. No.: 17/608,785

(22) PCT Filed: Mar. 30, 2020

(86) PCT No.: PCT/JP2020/014584
§ 371 (c)(1),
(2) Date: Nov. 4, 2021

(87) PCT Pub. No.: WO2020/225999
PCT Pub. Date: Nov. 12, 2020

(65) Prior Publication Data
US 2022/0318571 A1   Oct. 6, 2022

(30) Foreign Application Priority Data
May 8, 2019   (JP) .................................. 2019-088121

(51) Int. Cl.
*G06V 10/98*   (2022.01)
*G06F 18/20*   (2023.01)
(Continued)

(52) U.S. Cl.
CPC ............ *G06V 10/98* (2022.01); *G06F 18/217* (2023.01); *G06F 18/22* (2023.01); *G06F 18/29* (2023.01);
(Continued)

(58) Field of Classification Search
CPC ........ G06V 10/98; G06V 10/82; G06V 30/10; G06F 18/217; G06F 18/22; G06F 18/29;
(Continued)

(56) References Cited

FOREIGN PATENT DOCUMENTS

| JP | 2-1 4000 A | 1/1990 |
| JP | 2002-268679 A | 9/2002 |
| JP | 2011-197410 A | 10/2011 |

OTHER PUBLICATIONS

International Search Report mailed on Jun. 30, 2020 in PCT/JP2020/014584 filed on Mar. 30, 2020, 3 pages).

(Continued)

*Primary Examiner* — Qian Yang
(74) *Attorney, Agent, or Firm* — Oblon, McClelland, Maier & Neustadt, L.L.P.

(57) ABSTRACT

An object is to construct an environment in which a process for correcting a recognition error of a recognition result of voice recognition or character recognition is shown. A recognition error correction device 1 includes a pair data acquisition unit 21 that acquires pair data in which a sentence of the recognition result of voice recognition or character recognition and a label string composed of process labels that are labels indicating a process for correcting a recognition error for each word constituting the sentence are associated with each other and a correction model generation unit 22 that generates a correction model that is a learned model for correcting a recognition error of the recognition result by performing machine learning using the pair data acquired by the pair data acquisition unit 21.

10 Claims, 10 Drawing Sheets

(51) Int. Cl.
*G06F 18/21* (2023.01)
*G06F 18/22* (2023.01)
*G06N 3/08* (2023.01)
*G06V 10/82* (2022.01)
*G06V 30/10* (2022.01)

(52) U.S. Cl.
CPC ............... *G06N 3/08* (2013.01); *G06V 10/82* (2022.01); *G06V 30/10* (2022.01)

(58) Field of Classification Search
CPC ....... G06F 40/216; G06F 40/232; G06N 3/08; G06N 3/0442; G06N 3/0455; G10L 15/22
See application file for complete search history.

(56) References Cited

OTHER PUBLICATIONS

Sawai et al., "Usage of the unlabeled corpus by pseudo error generation for grammatical error correction", Proceedings of the 23rd Annual Meeting of the Association for Natural Language Processing [online], Mar. 2017, pp. 714-717, 8 total pages (with partial translation).

Ikeda et al., "Neural Sequence-Labelling Models for ASR Error Correction", The 33rd Annual Conference of the Japanese Society for Artificial Intelligence, 2019 [online], Jun. 4, 2019, pp. 1-4, 10 total pages (with partial translation).

International Preliminary Report on Patentability and Written Opinion issued Nov. 18, 2021 in PCT/JP2020/014584 (submitting English translation only), 5 pages.

Office Action issued Sep. 20, 2022, in corresponding Japanese Patent Application No. 2021-518316 (with English Translation), 7 pages.

RECOGNITION ERROR CORRECTION DEVICE AND CORRECTION MODEL

TECHNICAL FIELD

An aspect of the present disclosure relates to a recognition error correction device and a correction model for correcting a recognition error of a recognition result of voice recognition or character recognition.

BACKGROUND ART

The following Patent Literature 1 discloses an error detection method of automatically detecting a recognition error of a voice recognition result and supporting efficient manual correction.

CITATION LIST

Patent Literature

[Patent Literature 1] Japanese Unexamined Patent Publication No. 2002-268679

SUMMARY OF INVENTION

Technical Problem

In the above error detection method, the correction location of the voice recognition result is clarified, and a corrector is urged to call for correction. The corrector who is urged to call for correction manually corrects a correction location. However, what kind of process has to be performed to correct a correction location is not shown to the corrector.

Consequently, an aspect of the present disclosure was contrived in view of such a problem, and an object thereof is to provide a recognition error correction device and a correction model which are capable of constructing an environment in which a process for correcting a recognition error of a recognition result of voice recognition or character recognition is shown.

Solution to Problem

In order to solve the above problem, according to an aspect of the present disclosure, there is provided a recognition error correction device including: an acquisition unit configured to acquire pair data in which a sentence of a recognition result of voice recognition or character recognition and a label string composed of process labels that are labels indicating a process for correcting a recognition error for each word constituting the sentence are associated with each other; and a generation unit configured to generate a correction model that is a learned model for correcting a recognition error of the recognition result by performing machine learning using the pair data acquired by the acquisition unit.

According to such a recognition error correction device, a detection model is generated by performing machine learning using pair data in which a sentence of a recognition result of voice recognition or character recognition and a label string composed of process labels indicating a process for correcting a recognition error for each word constituting the sentence are associated with each other. For example, in a case where the recognition result of voice recognition or character recognition is applied to the generated detection model, a process label indicating a process for correcting a recognition error of the recognition result is output. That is, the recognition error correction device can construct an environment in which a process for correcting a recognition error of the recognition result of voice recognition or character recognition is shown.

Advantageous Effects of Invention

According to an aspect of the present disclosure, it is possible to construct an environment in which a process for correcting a recognition error of the recognition result of voice recognition or character recognition is shown.

DESCRIPTION OF EMBODIMENTS

Figure 1:
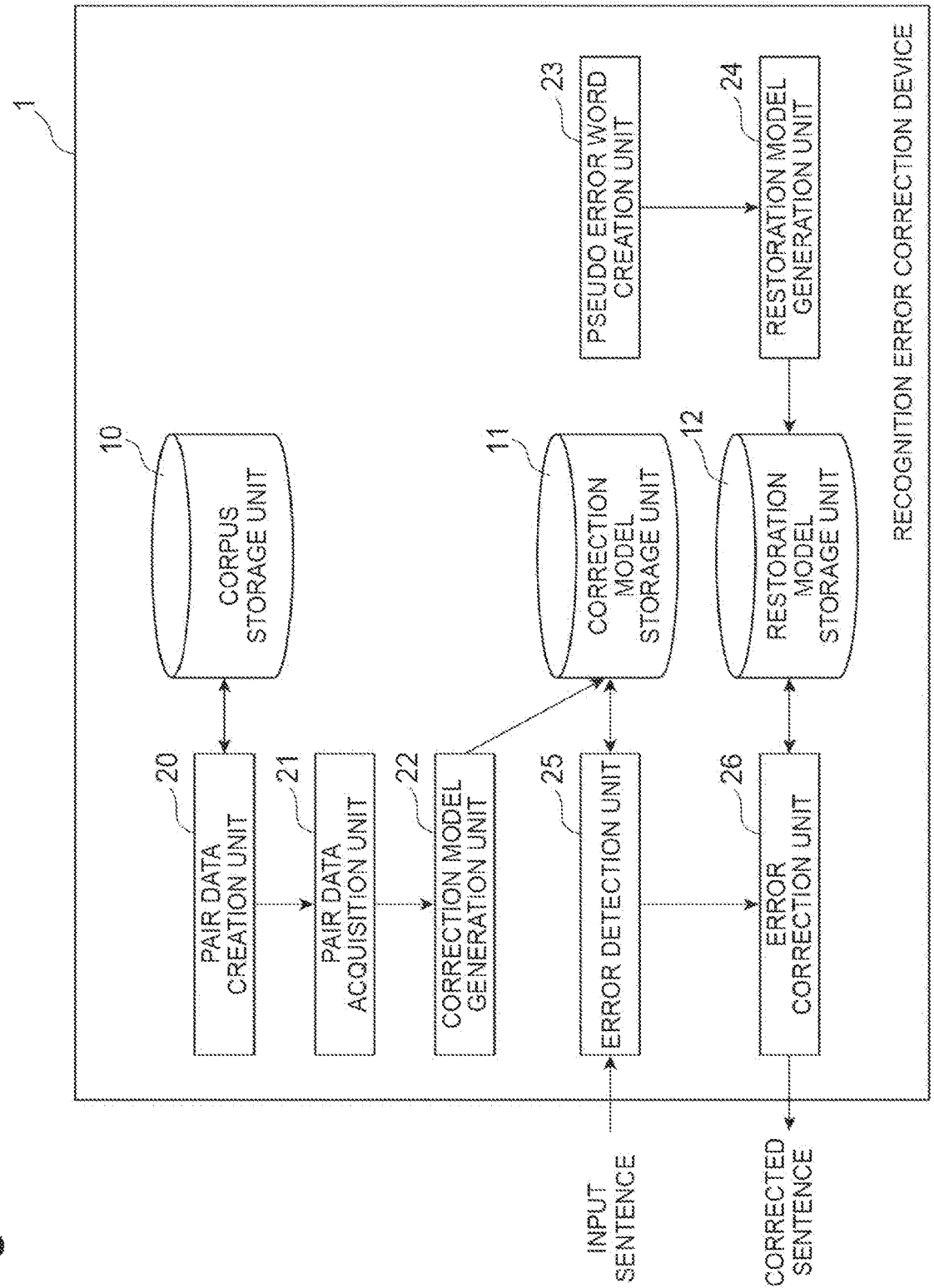
FIG. 1 is a functional block diagram of a recognition error correction device according to an embodiment of the present invention.

Hereinafter, embodiments of a recognition error correction device will be described in detail together with the accompanying drawings. Meanwhile, in the description of the drawings, the same components are denoted by the same reference numerals and signs, and thus description thereof will not be repeated. In addition, embodiments in the following description are specific examples of the present invention, and these embodiments are not intended to be limiting unless there is a statement that particularly limits the present invention.

A recognition error correction device 1 according to the present embodiment is a computer device that corrects a recognition error which is a recognition result of voice recognition or character recognition. The voice recognition involves recognizing a sound such as a human voice with a computer and converting the recognized sound into a corresponding sentence (character string, text) or the like. The character recognition involves recognizing characters such as printed characters and handwritten characters with a computer and converting the recognized characters into a corresponding sentence (character string, text) or the like.

The recognition result is, for example, the above-described converted sentence. Generally, the recognition result may include a recognition error due to a computer recognition error. A sentence is one unit of linguistic representation which is formally completed and unified by one statement. A sentence may be replaced with something composed of one or more sentence (such as, for example, a paragraph or composition).

FIG. 1 is a functional block diagram of the recognition error correction device 1. As shown in FIG. 1, the recognition error correction device 1 is configured to include a corpus storage unit 10, a correction model storage unit 11, a restoration model storage unit 12, a pair data creation unit 20 (creation unit), a pair data acquisition unit 21 (acquisition unit), a correction model generation unit 22 (generation unit), a pseudo error word creation unit 23, a restoration model generation unit 24, an error detection unit 25 (detection unit), and an error correction unit 26 (correction unit).

Each functional block of the recognition error correction device 1 is assumed to function within the recognition error correction device 1, but there is no limitation thereto. For example, some of the functional blocks of the recognition error correction device 1 may function while information is appropriately transmitted to and received from the recognition error correction device 1 within a computer device different from the recognition error correction device 1, the computer device being connected to the recognition error correction device 1 through a network. In addition, some of the functional blocks of the recognition error correction device 1 may be omitted, a plurality of functional blocks may be integrated into one functional block, or one functional block may be decomposed into a plurality of functional blocks.

Hereinafter, each functional block of the recognition error correction device 1 shown in FIG. 1 will be described.

The corpus storage unit 10 stores a corpus (in advance). The corpus is all or a portion of data (database) obtained by structuring sentences of natural language and accumulating them on a large scale. The corpus in the present embodiment (recognition error corrected corpus) is composed of corpus data that is data in which a sentence of the recognition result of voice recognition or character recognition and correct answer data of the recognition result are associated with each other. The correct answer data is data that is a correct answer. The correct answer data in the present embodiment is a voice or character that is the basis of the recognition result of voice recognition or character recognition performed by a person (or a computer device that performs high-accuracy recognition), or a sentence (transcription) which is created in advance with reference to the recognition result and in which the voice or the character is converted into text. The corpus data is training data in the field of machine learning. An example of the corpus data is corpus data in which a sentence of the recognition result "セキュリティ 祖父とにログイン" ("祖父と" is the recognition error) and correct answer data "セキュリティ フトにログイン" are associated with each other.

The pair data creation unit 20 creates pair data on the basis of the comparison between a sentence of the recognition result of voice recognition or character recognition and correct answer data of the recognition result. The pair data is data in which a sentence of the recognition result of voice recognition or character recognition and a label string composed of process labels that are labels indicating a process for correcting a recognition error for each word constituting the sentence are associated with each other. The pair data creation unit 20 may create pair data when instructed by a user (manager) of the recognition error correction device 1, or may periodically create the pair data. The pair data creation unit 20 may output the created pair data to the pair data acquisition unit 21, or may store the created pair data in the recognition error correction device 1 so that it can be referred to in another process.

Specifically, the pair data creation unit 20 acquires a corpus stored by the corpus storage unit 10, extracts a sentence of the recognition result of voice recognition or character recognition included in corpus data constituting the acquired corpus and correct answer data of the recognition result, morphologically analyzes the extracted recognition result sentence and correct answer data to decompose them into word strings, compares a word string of the decomposed recognition result sentence and a word string of decomposed correct answer data for each word (in order from the first word to the last word), assigns a process label according to the comparison result to each word (or some words) of the recognition result sentence, and creates pair data in which the word string of the decomposed recognition result sentence (which is substantially the same as the recognition result sentence) and a label string composed of the assigned process labels are associated with each other. In the pair data, one word in the word string of the recognition result sentence and a process label assigned to the one word included in the label string may be associated with each other.

Figure 2:
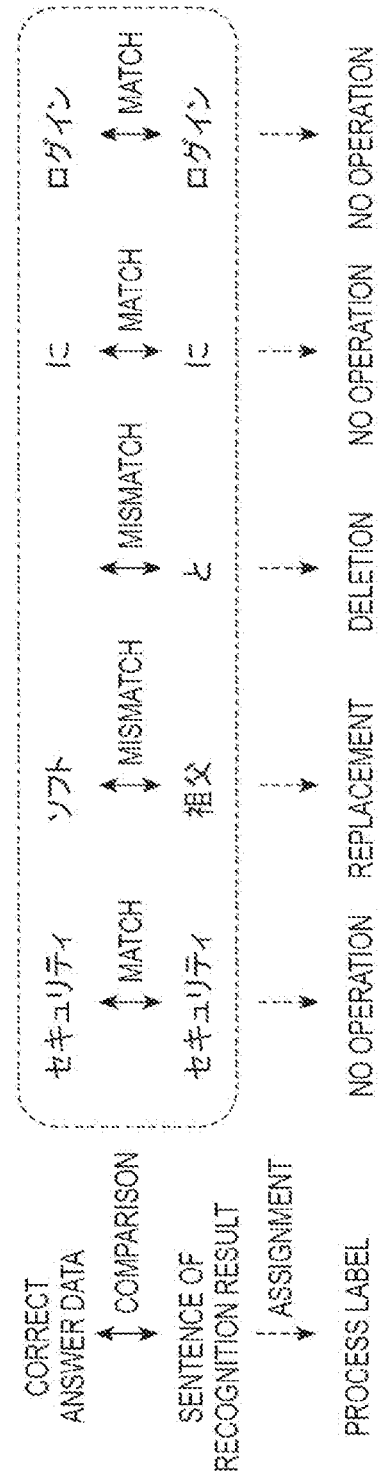
FIG. 2 is a diagram illustrating an example of creation of pair data.

FIG. 2 is a diagram illustrating an example of creation of pair data performed by the pair data creation unit 20. As shown in FIG. 2, the pair data creation unit 20 first compares a sentence of the recognition result of voice recognition or character recognition "セキュ リティ祖父とにログイン" with correct answer data of the recognition result "セキュリティソ フトにログイン" for each word. Next, since the pair data creation unit 20 compares the first word of the recognition result sentence "セキュリティ" with the first word of the correct answer data "セキュリティ" and these first words match each other, the word of the recognition result sentence " セキュリティ" is assigned a "no operation" label, as a process label, indicating that no process is required to correct a recognition error with respect to the word "セキュ リティ." Next, since the pair data creation unit 20 compares the next word of the recognition result sentence "祖父" with the next word of the correct answer data "ソフト" and these words do not match each other (mismatch), the word of the recognition result sentence "祖父" is assigned a "replacement" label, as a process label, indicating that a replacement process is required to correct a recognition error with respect to the word "祖父." Next, since there is no corresponding word in the correct answer data with respect to the next word of the recognition result sentence "と" (due to mismatch), the pair data creation unit 20 assigns the word of the recognition result sentence "と" a "deletion" label, as a process label, indicating that a deletion process is required to correct a recognition error with respect to the word "と ."

Next, since the pair data creation unit 20 compares the next word of the recognition result sentence "に" with the next word of the correct answer data "に" and these words match each other, the word of the recognition result sentence "に" is assigned a "no operation" label, as a process label, indicating that no process is required to correct a recognition error with respect to the word "に ." Next, since the pair data creation unit 20 compares the next word of the recognition result sentence "ログイン" with the next word of the correct answer data "ログイン" and these words match each other, the word of the recognition result sentence "

ログイン" is assigned a "no operation" label, as a process label, indicating that no process is required to correct a recognition error with respect to the word "ログイン." Next, the pair data creation unit 20 creates pair data in which the recognition result sentence (word string) "セキュリティ祖父とにログイン" and the label string composed of the assigned process labels "[no operation, replacement, deletion, no operation, no operation]" are associated with each other. Meanwhile, the label string may be in a format including association with words, for example, "[[セキュリティ, no operation], [祖父, replacement], [と, deletion], [に, no operation], [ログイン, no operation]]."

The pair data acquisition unit 21 acquires the pair data. The pair data acquisition unit 21 may acquire the pair data created (input) by the pair data creation unit 20. The pair data acquisition unit 21 may acquire the pair data from another computer device through a network, may acquire the pair data stored in the recognition error correction device 1, or may acquire the pair data which is input by a user of the recognition error correction device 1. The pair data acquisition unit 21 outputs the acquired pair data to the correction model generation unit 22.

The correction model generation unit 22 generates a correction model that is a learned model for correcting a recognition error of the recognition result by performing machine learning using the pair data (learning data) acquired (input) by the pair data acquisition unit 21. A process of obtaining a learned model through machine learning using the pair data is a process according to the related art. The correction model generation unit 22 causes the correction model storage unit 11 to store the generated correction model.

The learned model is a combination of a computer program and parameters. In addition, the learned model is a combination of the structure of a neural network and a parameter (weighting coefficient) that is the strength of each connection between neuron of the neural network. In addition, the learned model is a command to a computer which is combined so that one result can be obtained (a predetermined process can be executed), that is, a computer program for causing the computer to function.

The correction model is a learned model for causing a computer to function so as to output a process label that is a label indicating a process for correcting a recognition error of the recognition result on the basis of the recognition result of voice recognition or character recognition, the learned model being constituted by a neural network where weighting coefficients are learned using pair data in which a sentence of the recognition result and a label string composed of process labels indicating a process for correcting a recognition error for each word constituting the sentence are associated with each other.

The correction model generation unit 22 may perform machine learning using a sequence labeling method when a correction model is generated. Sequence labeling involves predicting an appropriate label string for each element of the input data string (word string). The sequence labeling aims to assign a label to each piece of data constituting the input data string.

Figure 3:
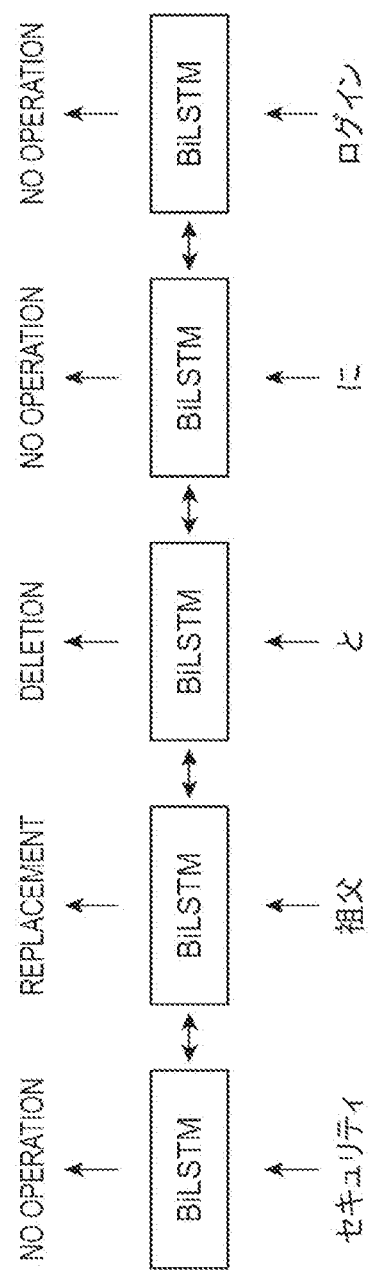
FIG. 3 is a diagram illustrating an example of application to a correction model.

FIG. 3 is a diagram illustrating an example of application to a correction model. As shown in FIG. 3, by applying the recognition result sentence of voice recognition or character recognition "セキュリティ祖父とにログイン" to a correction model constituted by a bidirectional LSTM (bidirectional long short-term memory (BiLSTM)), the process label "no operation" is output for the word "セキュリティ" constituting the recognition result sentence, the process label "replacement" is output for the word "祖父," the process label "deletion" is output for the word "と," the process label "no operation" is output for the word "に," and the process label "no operation" is output for the word "ログイン." The term "output" as used here refers to output of a process label candidate having the highest likelihood among one or more process label candidates which are calculated by a bidirectional LSTM for each word. Meanwhile, from the output process labels, the recognition error correction device 1 can determine that "祖父" and "と" among words constituting the recognition result sentence are recognition errors. That is, the recognition error correction device 1 can determine that a word to which a process label indicating a process for substantial correction (such as replacement or deletion) is assigned or output is a recognition error. The process label is also a label specialized for error detection or error correction. By using a bidirectional LSTM as a correction model, learning is performed in consideration of the context before and after, and thus it is also possible to cope with a pattern which is not present in pair data that is learning data (it is possible to output a process label).

The correction model storage unit 11 stores the correction model generated by the correction model generation unit 22.

Figure 4:
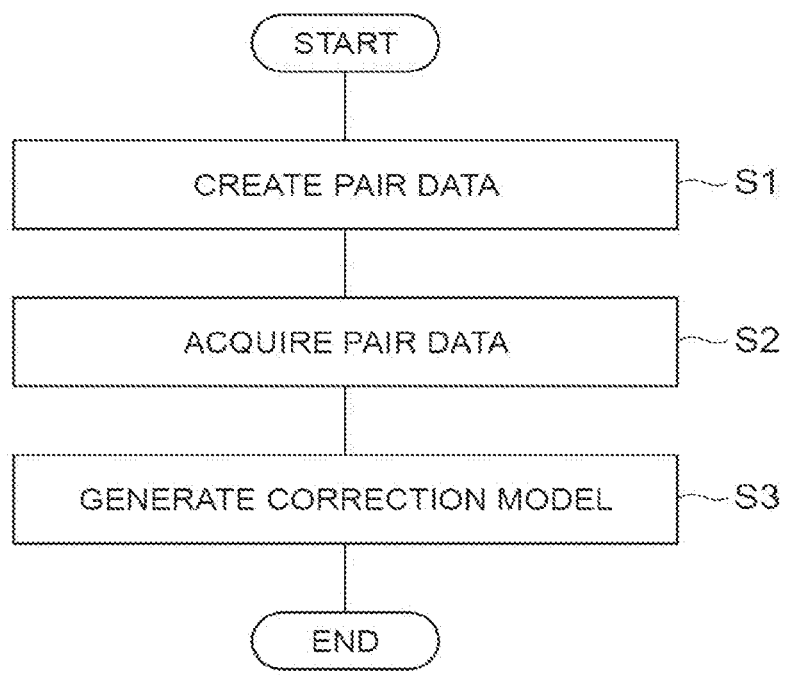
FIG. 4 is a flowchart illustrating a correction model generation process which is executed by a recognition error correction device according to the embodiment of the present invention.

Processing of a correction model generation method which is executed by the recognition error correction device 1 will be described with reference to a flowchart shown in FIG. 4. First, pair data is created by the pair data creation unit 20 (step S1). Next, the pair data created in S1 is acquired by the pair data acquisition unit 21 (step S2). Next, a correction model is generated by the correction model generation unit 22 by performing machine learning using the pair data acquired in S2, and the generated correction model is stored by the correction model storage unit 11 (step S3).

The pseudo error word creation unit 23 creates a pseudo error word that is a word to which an error is added with respect to an input word that is a predetermined input word. The input word may be extracted from a word set stored in the recognition error correction device 1 in advance, or may be input (designated) by a user of the recognition error correction device 1. The pseudo error word creation unit 23 may create a pseudo error word when instructed by the user of the recognition error correction device 1, or may periodically create a pseudo error word. The pseudo error word creation unit 23 outputs a set of the input word and the created pseudo error word to the restoration model generation unit 24.

Figure 5:
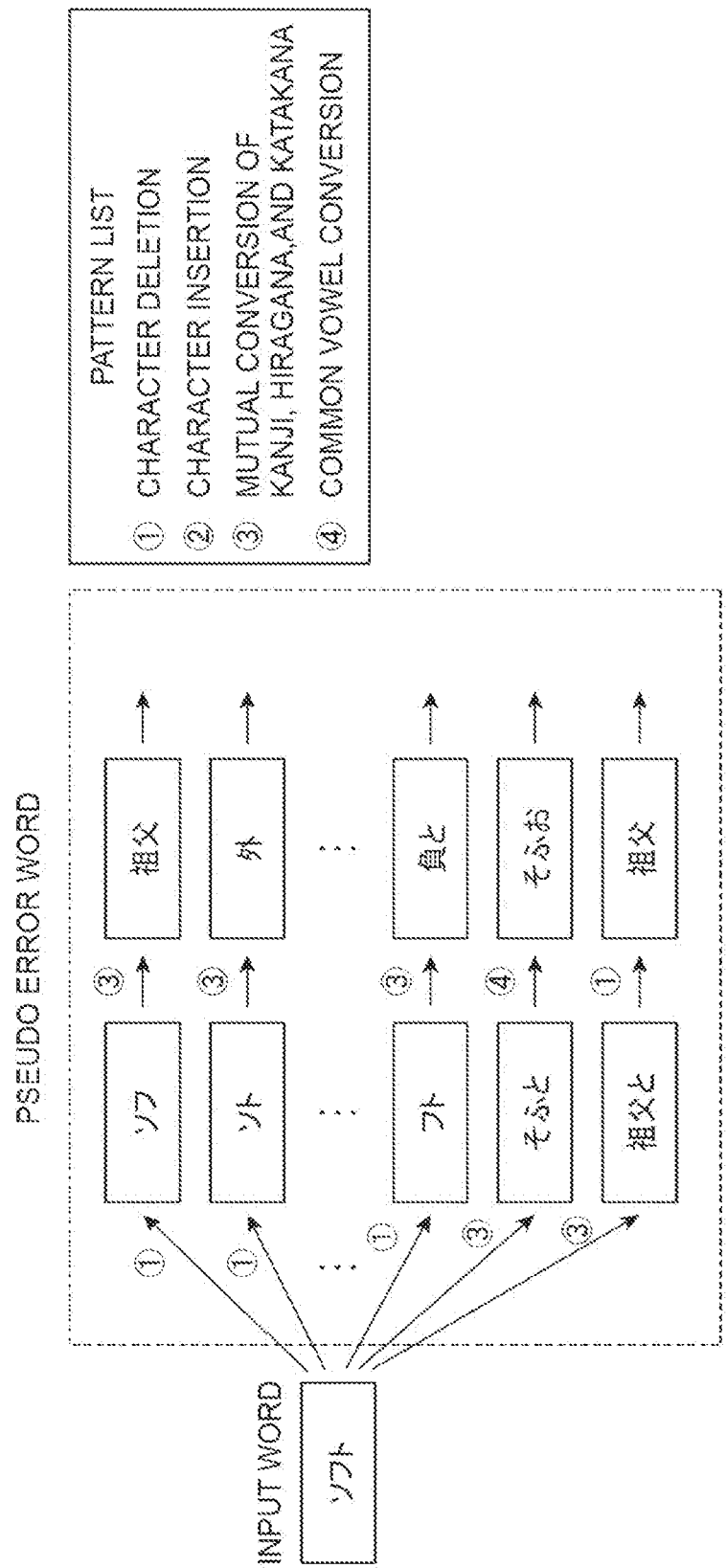
FIG. 5 is a diagram illustrating an example of creation of a pseudo error word.

FIG. 5 is a diagram illustrating an example of creation of a pseudo error word performed by the pseudo error word creation unit 23. As shown in FIG. 5, the pseudo error word creation unit 23 adds an error to an input word by combining four patterns (error generation patterns). The first pattern is character deletion. The second pattern is character insertion. The third pattern is mutual conversion of kanji, hiragana, and katakana. The fourth pattern is common vowel conversion. The pseudo error word creation unit 23 may repeatedly apply each pattern to the input word to load an error. For example, the pseudo error word creation unit 23 may apply the first pattern to the input word "ソフト" to create "ソフ," subsequently apply the third pattern to create "祖父," and use the created "祖父" as a pseudo error word.

The restoration model generation unit 24 generates a restoration model that is a learned model for restoring an erroneous word to an error-free word on the basis of a set (learning data) of the input word which is input by the pseudo error word creation unit 23 and the pseudo error word (created by the pseudo error word creation unit 23). That is, the restoration model is a learned model generated by performing machine learning using a predetermined word and a pseudo error word obtained by adding an error to the predetermined word. A process of obtaining a learned model through machine learning using set data is a process according to the related art. The restoration model generation unit 24 performs repeated learning until pseudo error words of learning data can be restored to error-free words. The restoration model generation unit 24 causes the restoration model storage unit 12 to store the generated restoration model.

The restoration model is a learned model for causing a computer to function so as to output (corresponding) error-free words on the basis of erroneous words, the learned model being constituted by a neural network in which weighting coefficients are learned using a set of the input word and a pseudo error word.

Figure 6:
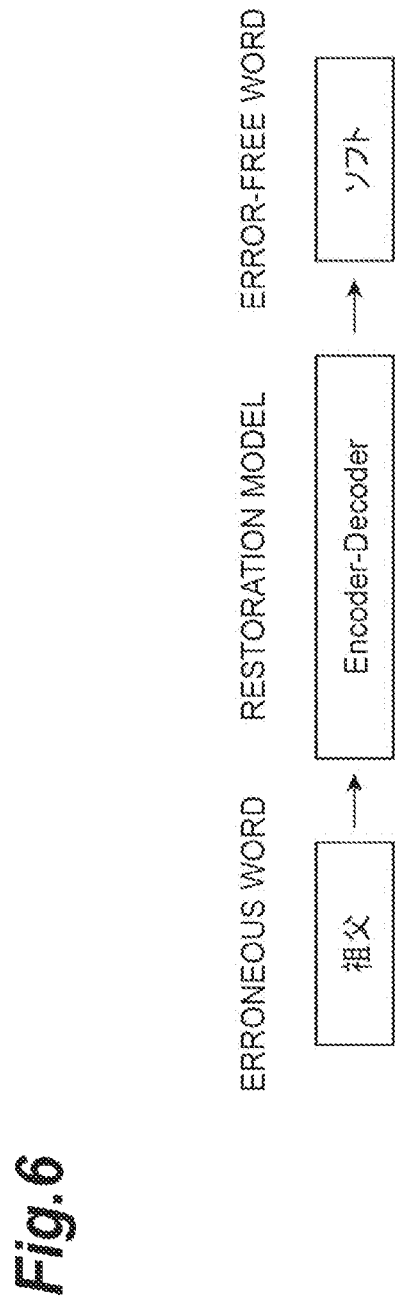
FIG. 6 is a diagram illustrating an example of application to a restoration model.

FIG. 6 is a diagram illustrating an example of application to a restoration model. As shown in FIG. 6, an error-free word "ソフト" is output by applying an erroneous word "祖父" to the restoration model constituted by an encoder-decoder model. By using an encoder-decoder model as the restoration model, a huge amount of learning data (and process contents based thereon) can be absorbed into one learned model.

Figure 7:
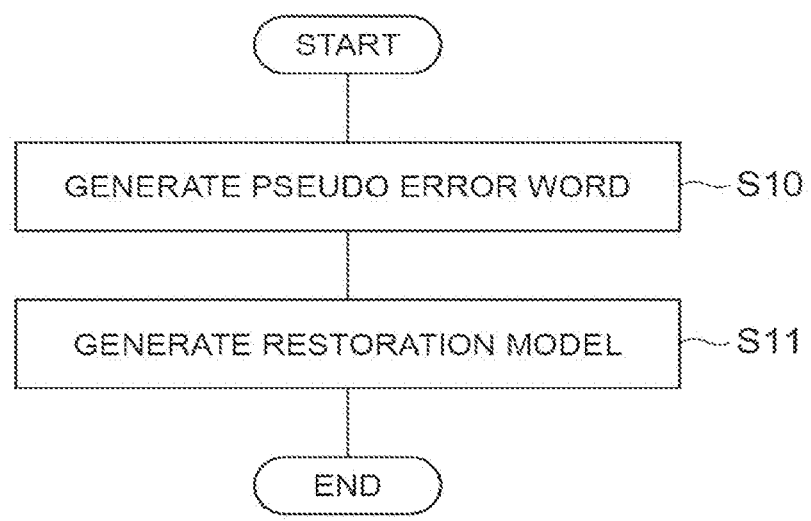
FIG. 7 is a flowchart illustrating a restoration model generation process which is executed by the recognition error correction device according to the embodiment of the present invention.

Processing of a restoration model generation method which is executed by the recognition error correction device 1 will be described with reference to a flowchart shown in FIG. 7. First, a pseudo error word is created by the pseudo error word creation unit 23 with respect to the input word (step S10). Next, a restoration model is generated by the restoration model generation unit 24 on the basis of a set of the input word and the pseudo error word created in S10, and the generated restoration model is stored by the restoration model storage unit 12 (step S11).

The error detection unit 25 detects an error word that is a recognition error word included in the input sentence by applying the input sentence that is a recognition result sentence to the correction model generated by the correction model generation unit 22. More specifically, the error detection unit 25 acquires an input sentence that is a sentence of the recognition result of voice recognition or character recognition (a sentence different from the corpus data sentence used when the above-described correction model is generated) from the recognition error correction device 1, a user of the recognition error correction device 1, another computer device, or the like and applies it to the correction model generated by the correction model generation unit 22 and stored by the correction model storage unit 11, to thereby detect an error word that is a recognition error word included in the input sentence. As described in FIG. 3, the error word is detected on the basis of the process label which is output when applied to the correction model. For example, the error detection unit 25 detects a word for which the process label "replacement" or "deletion" is output as an error word. The error detection unit 25 outputs the acquired input sentence, the detected error word (or information relating thereto), and a process label string composed of process labels which are output for each word when applied to the correction model to the error correction unit 26.

The error correction unit 26 corrects a recognition error of the input sentence by performing a process based on the process label which is output for the error word when applied to the correction model with respect to the error word detected (input) by the error detection unit 25. More specifically, the error correction unit 26 corrects a recognition error of the input sentence by performing a process based on the process label associated with the error word in the process label string which is input by the error detection unit 25 with respect to the error word which is input by the error detection unit 25 among the words constituting the input sentence input by the error detection unit 25. The error correction unit 26 outputs (displays) a corrected sentence that is an input sentence obtained by correcting a recognition error to a user of the recognition error correction device 1, another computer device, or the like.

The error correction unit 26 may apply the error word (as described with reference to FIG. 6) to the restoration model (generated by the restoration model generation unit 24 and stored by the restoration model storage unit 12) when a process based on the process label is performed on the error word. The error correction unit 26 may construct a word lattice on the basis of the input sentence and the output process label and correct a recognition error of the input sentence on the basis of a path of the word lattice. The word lattice is a graph listing word candidates.

Figure 8:
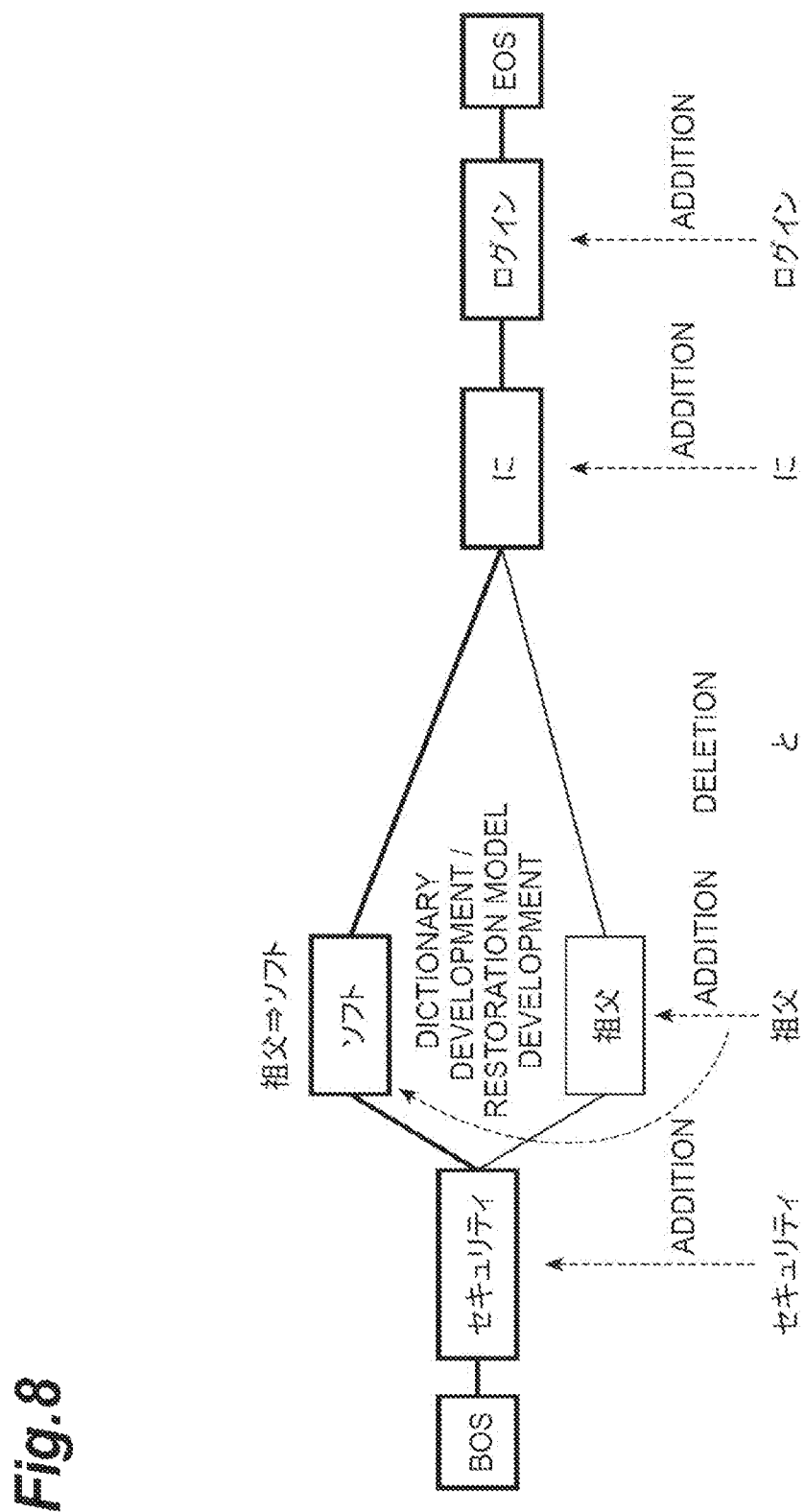
FIG. 8 is a diagram illustrating an example of construction of a word lattice.

FIG. 8 is a diagram illustrating an example of construction of a word lattice from the error correction unit 26. First, the error correction unit 26 creates a path of a word lattice on the basis of the process label associated with each word constituting the input sentence with respect to the input sentence "セキュリティ祖父とにログイン." Specifically, an associated word is added to the path with respect to the process label "no operation," an associated word is not added to the path with respect to the process label "deletion," an associated word is added to the path with respect to the process label "replacement," and a word that is a correction candidate is also added to the path (as a branch). For example, in a case where a process label string for the input sentence is "[[セキュリティ, no operation], [祖父, replacement], [と, deletion], [に, no operation], [ログイン, no operation]]," the error correction unit 26 constructs the word lattice shown in FIG. 8.

In FIG. 8, "BOS" (Beginning Of Sentence) indicates the beginning of a sentence. "EOS" (End Of Sentence) indicates the end of a sentence. For the words "セキュリティ," "に," and "ログイン," since the process labels are "no operation," these words are added to the word lattice as they are. For the word "と," since the process label is "deletion," this word is not added to the word lattice. For the word "祖父," since the process label is "replacement," this word is added to the word lattice as it is, and the correction candidate word "ソフト" is also added to the path in the form of branching (ramifying) the path. The correction candidate word may be a word associated with an error word in a dictionary (pair data in which this word is likely to be this word) stored in advance in the recognition error correction device 1, or may be a word which is output by applying an error word to the restoration model. In a case where the correction candidate word is not in the dictionary, the word may be obtained by applying it to the restoration model. There may be a plurality of correction candidate words, and in that case the word lattice branches to that extent.

The error correction unit 26 selects an appropriate word string (path) as a sentence using, for example, an identification model based on a perceptron model with respect to the constructed word lattice, and outputs the selected word string as a corrected sentence (a sentence obtained by correcting a recognition error of the input sentence). A process of selecting a word string is a process according to the related art.

Figure 9:
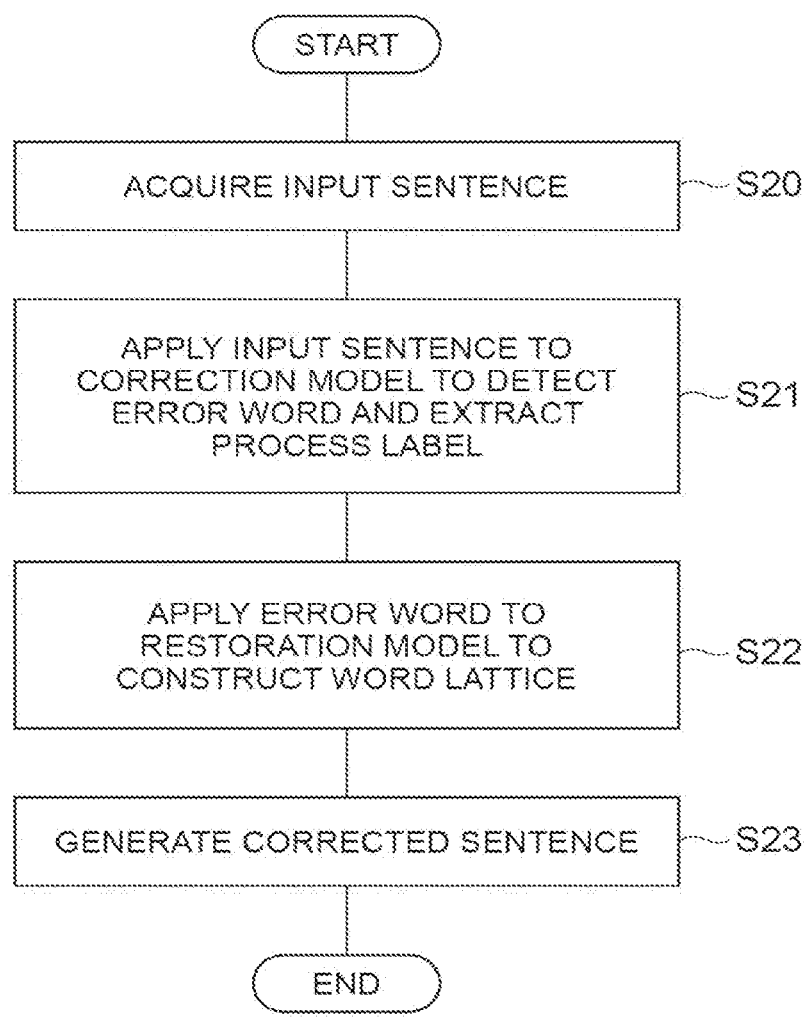
FIG. 9 is a flowchart illustrating a recognition error correction process which is executed by the recognition error correction device according to the embodiment of the present invention.

Processing of a recognition error correction method which is executed by the recognition error correction device 1 will be described with reference to a flowchart shown in FIG. 9. First, an input sentence is acquired by the error detection unit 25 (step S20). Next, the input sentence acquired in S20 by the error detection unit 25 is applied to the correction model stored by the correction model storage unit 11, an error word is detected, and a process label is extracted (step S21). Next, the error word detected in S21 by the error correction unit 26 is applied to the restoration model stored by the restoration model storage unit 12, and a word lattice is constructed (step S22). Next, a corrected sentence is generated by the error correction unit 26 on the basis of the word lattice constructed in S22 (step S23).

Next, the operational effects of the recognition error correction device 1 configured as in the present embodiment will be described.

According to the recognition error correction device 1 of the present embodiment, the pair data acquisition unit 21 acquires pair data in which a sentence of the recognition result of voice recognition or character recognition and a label string composed of process labels that are labels indicating a process for correcting a recognition error for each word constituting the sentence are associated with each other, and the correction model generation unit 22 performs machine learning using the acquired pair data, whereby a correction model that is a learned model for correcting a recognition error of the recognition result is generated. In this way, a detection model is generated by performing machine learning using the pair data in which the recognition result sentence and the label string composed of process labels for correcting a recognition error for each word constituting the sentence are associated with each other. For example, in a case where the recognition result of voice recognition or character recognition is applied to the generated detection model, a process label indicating a process for correcting a recognition error of the recognition result is output. That is, the recognition error correction device 1 can construct an environment in which a process for correcting a recognition error of the recognition result of voice recognition or character recognition is shown.

In addition, according to the recognition error correction device 1 of the present embodiment, the correction model generation unit 22 performs machine learning using a sequence labeling method. This makes it possible to more reliably perform machine learning using a process label.

In addition, according to the recognition error correction device 1 of the present embodiment, the pair data creation unit 20 creates pair data on the basis of the comparison between a sentence of a recognition result and correct answer data of the recognition result, and the pair data acquisition unit 21 acquires the created pair data. This makes it possible to more easily and more reliably create learning data of a correction model.

In addition, according to the recognition error correction device 1 of the present embodiment, the error detection unit 25 detects an error word that is a word of a recognition error included in an input sentence that is a sentence of the recognition result by applying the input sentence to the correction model generated by the correction model generation unit 22. This makes it possible to more reliably detect an error word to be corrected.

In addition, according to the recognition error correction device 1 of the present embodiment, the error correction unit 26 corrects a recognition error of the input sentence by performing a process based on the process label which is output for the error word when applied to the correction model with respect to the error word detected by the error detection unit 25. This makes it possible to more reliably correct a recognition error of the input sentence.

In addition, according to the recognition error correction device 1 of the present embodiment, when the process based on the process label is performed on the error word, the error correction unit 26 applies the error word to a restoration model that is a learned model generated by performing machine learning using a predetermined word and a pseudo error word obtained by adding an error to the predetermined word, the restoration model restoring an erroneous word to an error-free word. By applying the error word to the restoration model in this way, it is possible to more accurately correct a recognition error.

In addition, according to the recognition error correction device 1 of the present embodiment, the error correction unit 26 constructs a word lattice on the basis of the input sentence and the output process label, and corrects a recognition error of the input sentence on the basis of a path of the word lattice. By using the word lattice in this way, it is possible to more accurately and more easily correct a recognition error.

Here, examples of problems of the related art include a decrease in the accuracy of recognition depending on the usage environment such as the performance of a sound collecting microphone or ambient noise in a case where a voice recognition system is used in the real world. In the recognition error correction device 1 of the present embodiment, a system for improving the accuracy of voice recognition is realized by correcting a voice recognition error. Specifically, the recognition error correction device 1 detects a voice recognition error location from a voice recognition result using a sequence labeling method. Next, the recognition error correction device 1 constructs a word lattice including correction candidates using a dictionary or an encoder-decoder model, and corrects the voice recognition result by selecting an optimum word string using a structured perceptron.

A correction model learned from a recognition error corrected corpus is used by the recognition error correction device 1, so that it is possible to perform correction based on recognition error information that has not been used in voice recognition engines of the related art. In addition, the recognition error correction device 1 learns a restoration model using pseudo error words which are automatically generated by the pseudo error word creation unit 23. Words which are not present in a dictionary can also be corrected by using the restoration model. In addition, the recognition error correction device 1 can reduce a correction error by selecting an appropriate word string using an identification model.

The recognition error correction device 1 can also adopt the following configurations. That is, there is provided a voice recognition error correction system using a voice recognition result as an input, the system including a voice recognition error detection means for detecting a voice recognition error from a voice recognition result serving as an input, an error word correction means for automatically generating an error word and using a model learned from a pseudo error word, a word lattice construction means for constructing a word lattice using the error word correction means or a dictionary as a result of the voice recognition error detection means, and a word selection means for selecting an optimum path of the word lattice constructed by the word lattice construction means. The voice recognition error correction system may further include an operation label creation means for assigning an operation label to each word by comparison between a "voice recognition result"

and "transcription" of a recognition error corrected corpus and a voice recognition error detection model learning means for learning a voice recognition error detection model using a sequence labeling method from a word string and a label string thereof obtained by the label assignment means, and a voice recognition error may be detected using the obtained voice recognition error detection model. The voice recognition error correction system may further include a pseudo error word automatic generation function for generating an error word in a pseudo manner using a plurality of patterns and an error word correction model learning function for learning a voice recognition error detection model using a pseudo error word generated by the pseudo error word automatic generation function, and a voice recognition error word may be corrected using the obtained error word correction model. The voice recognition error correction system may construct a word lattice using the error word correction means and the dictionary as a result of the voice recognition error detection means. The voice recognition error correction system may select an optimum path of the word lattice constructed by the word lattice construction means.

Meanwhile, the block diagram used in the description of the above embodiment represents blocks in units of functions. These functional blocks (constituent elements) are realized by any combination of at least one of hardware and software. In addition, a method of realizing each functional block is not particularly limited. That is, each functional block may be realized using one device which is physically or logically coupled, or may be realized using two or more devices which are physically or logically separated from each other by connecting the plurality of devices directly or indirectly (for example, using a wired or wireless manner or the like). The functional block may be realized by combining software with the one device or the plurality of devices.

Examples of the functions include determining, deciding, judging, calculating, computing, process, deriving, investigating, search, ascertaining, receiving, transmitting, output, access, resolving, selecting, choosing, establishing, comparing, assuming, expecting, considering, broadcasting, notifying, communicating, forwarding, configuring, reconfiguring, allocating (or mapping), assigning, and the like, but there is no limitation thereto. For example, a functional block (constituent element) for causing transmitting to function is referred to as a transmitting unit or a transmitter. As described above, any realization methods are not particularly limited.

Figure 10:
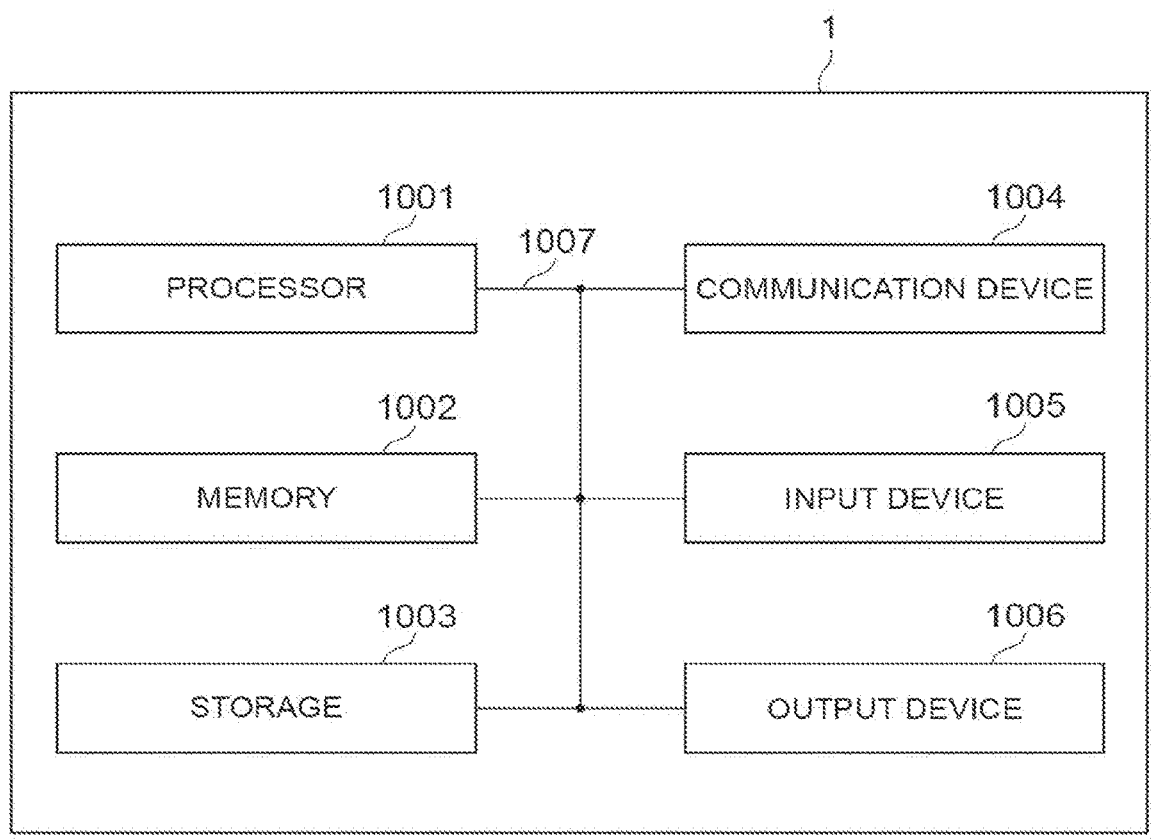
FIG. 10 is a hardware configuration diagram of the recognition error correction device according to the embodiment of the present invention.

For example, the recognition error correction device 1 or the like in an embodiment of the present disclosure may function as a computer that performs processing of recognition error correction of the present disclosure. FIG. 10 is a diagram illustrating an example of a hardware configuration of the recognition error correction device 1 according to an embodiment of the present disclosure. The above-described recognition error correction device 1 may be physically configured as a computer device including a processor 1001, a memory 1002, a storage 1003, a communication device 1004, an input device 1005, an output device 1006, a bus 1007, and the like.

Meanwhile, in the following description, the word "device" may be replaced with "circuit," "unit," or the like. The hardware configuration of the recognition error correction device 1 may be configured to include one or a plurality of devices shown in the drawings, or may be configured without including some of the devices.

The processor 1001 performs an arithmetic operation by reading predetermined software (a program) onto hardware such as the processor 1001 or the memory 1002, and thus each function of the recognition error correction device 1 is realized by controlling communication in the communication device 1004 or controlling at least one of reading-out and writing of data in the memory 1002 and the storage 1003.

The processor 1001 controls the whole computer, for example, by operating an operating system. The processor 1001 may be constituted by a central processing unit (CPU) including an interface with a peripheral device, a control device, an arithmetic operation device, a register, and the like. For example, the pair data creation unit 20, the pair data acquisition unit 21, the correction model generation unit 22, the pseudo error word creation unit 23, the restoration model generation unit 24, the error detection unit 25, the error correction unit 26, and the like may be realized by the processor 1001.

In addition, the processor 1001 reads out a program (a program code), a software module, data, or the like from at least one of the storage 1003 and the communication device 1004 into the memory 1002, and executes various types of processes in accordance therewith. An example of the program which is used is a program causing a computer to execute at least some of the operations described in the foregoing embodiment. For example, the pair data creation unit 20, the pair data acquisition unit 21, the correction model generation unit 22, the pseudo error word creation unit 23, the restoration model generation unit 24, the error detection unit 25, and the error correction unit 26 may be realized by a control program which is stored in the memory 1002 and operates in the processor 1001, and other functional blocks may be realized in the same manner Although the execution of various types of processes by one processor 1001 has been described above, these processes may be simultaneously or sequentially executed by two or more processors 1001. One or more chips may be mounted in the processor 1001. Meanwhile, the program may be transmitted from a network through an electrical communication line.

The memory 1002 is a computer readable recording medium, and may be constituted by at least one of, for example, a read only memory (ROM), an erasable programmable ROM (EPROM), an electrically erasable programmable ROM (EEPROM), a random access memory (RANI), and the like. The memory 1002 may be referred to as a register, a cache, a main memory (main storage device), or the like. The memory 1002 can store a program (a program code), a software module, or the like that can be executed in order to carry out a wireless communication method according to an embodiment of the present disclosure.

The storage 1003 is a computer readable recording medium, and may be constituted by at least one of, for example, an optical disc such as a compact disc ROM (CD-ROM), a hard disk drive, a flexible disk, a magneto-optic disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The foregoing storage medium may be, for example, a database including at least one of the memory 1002 and the storage 1003, a server, or another suitable medium.

The communication device 1004 is hardware (a transmitting and receiving device) for performing communication between computers through at least one of a wired network and a wireless network, and is also referred to as, for example, a network device, a network controller, a network card, a communication module, or the like. The communication device 1004 may be configured to include a high-frequency switch, a duplexer, a filter, a frequency synthesizer, or the like in order to realize at least one of, for example, frequency division duplex (FDD) and time division duplex (TDD). For example, the pair data acquisition unit 21, the error detection unit 25, the error correction unit 26, and the like may be realized by the communication device 1004.

The input device 1005 is an input device (such as, for example, a keyboard, a mouse, a microphone, a switch, a button, or a sensor) that receives an input from the outside. The output device 1006 is an output device (such as, for example, a display, a speaker, or an LED lamp) that executes an output to the outside. Meanwhile, the input device 1005 and the output device 1006 may be an integrated component (for example, a touch panel).

In addition, respective devices such as the processor 1001 and the memory 1002 are connected to each other through the bus 1007 for communicating information. The bus 1007 may be configured using a single bus, or may be configured using different buses between devices.

In addition, the recognition error correction device 1 may be configured to include hardware such as a microprocessor, a digital signal processor (DSP), an application specific integrated circuit (ASIC), a programmable logic device (PLD), or a field programmable gate array (FPGA), or some or all of the respective functional blocks may be realized by the hardware. For example, at least one of these types of hardware may be mounted in the processor 1001.

Notification of information is not limited to the aspects/embodiments described in the present disclosure, and may be performed using other methods.

The aspects/embodiments described in the present disclosure may be applied to at least one of a system employing long term evolution (LTE), LTE-Advanced (LTE-A), SUPER 3G IMT-Advanced, a 4th generation mobile communication system (4G), a 5th generation mobile communication system (5G), future radio access (FRA), new Radio (NR), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended on the basis thereof. In addition, a plurality of systems may be combined (for example, 5G and at least one of LTE and LTE-A are combined or the like) and be applied.

The order of the processing sequences, the sequences, the flow charts, and the like of the aspects/embodiments described above in the present disclosure may be changed as long as they are compatible with each other. For example, in the methods described in the present disclosure, various steps as elements are presented using an exemplary order but the methods are not limited to the presented order.

The input or output information or the like may be stored in a specific place (for example, a memory) or may be managed using a management table. The input or output information or the like may be overwritten, updated, or added. The output information or the like may be deleted. The input information or the like may be transmitted to another device.

Determination may be performed using a value (0 or 1) which is expressed by one bit, may be performed using a Boolean value (true or false), or may be performed by comparison of numerical values (for example, comparison thereof with a predetermined value).

The aspects/embodiments described in the present disclosure may be used alone, may be used in combination, or may be switched during implementation thereof. In addition, notification of predetermined information (for example, notification of "X") is not limited to explicit transmission, and may be performed by implicit transmission (for example, the notification of the predetermined information is not performed).

Hereinbefore, the present disclosure has been described in detail, but it is apparent to those skilled in the art that the present disclosure should not be limited to the embodiments described in the present disclosure. The present disclosure can be implemented as modified and changed aspects without departing from the spirit and scope of the present disclosure, which are determined by the description of the scope of claims. Therefore, the description of the present disclosure is intended for illustrative explanation only, and does not impose any limited interpretation on the present disclosure.

Regardless of whether it is called software, firmware, middleware, microcode, hardware description language, or another name, software can be widely construed to refer to an instruction, an instruction set, codes, code segments, program codes, a program, a sub-program, a software module, an application, a software application, a software package, a routine, a sub-routine, an object, an executable file, an execution thread, an order, a function, or the like.

In addition, software, a command, information, and the like may be transmitted and received through a transmission medium. For example, when software is transmitted from a website, a server, or another remote source using at least one of wired technology (such as a coaxial cable, an optical fiber cable, a twisted-pair wire, or a digital subscriber line (DSL)) and wireless technology (such as infrared rays or microwaves), at least one of the wired technology and the wireless technology are included in the definition of a transmission medium.

Information, a signal or the like described in the present disclosure may be expressed using any of various different techniques. For example, data, an instruction, a command, information, a signal, a bit, a symbol, and a chip which can be mentioned in the overall description may be expressed by a voltage, a current, an electromagnetic wave, a magnetic field or magnetic particles, an optical field or photons, or any combination thereof.

Meanwhile, the terms described in the present disclosure and the terms required for understanding the present disclosure may be substituted by terms having the same or similar meanings.

The terms "system" and "network" which are used in the present disclosure are used interchangeably.

In addition, information, parameters, and the like described in the present disclosure may be expressed using absolute values, may be expressed using values relative to a predetermined value, or may be expressed using other corresponding information.

The names used for the above-described parameters are not limited in any way. Further, mathematical formulas and the like using these parameters may differ from those explicitly disclosed in the present disclosure.

The term "determining" which is used in the present disclosure may include various types of operations. The term "determining" may include regarding operations such as, for example, judging, calculating, computing, processing, deriving, investigating, looking up/search/inquiry (for example, looking up in a table, a database or a separate data structure), or ascertaining as an operation such as "determining." In addition, the term "determining" may include regarding operations such as receiving (for example, receiving information), transmitting (for example, transmitting information), input, output, or accessing (for example, accessing data in a memory) as an operation such as "determining" In addition, the term "determining" may include regarding operations such as resolving, selecting, choosing, establishing, or comparing as an operation such as "determining" That is, the term "determining" may include regarding some kind of operation as an operation such as "determining" In addition, the term "determining" may be replaced with the term "assuming," "expecting," "considering," or the like.

The terms "connected" and "coupled" and every modification thereof refer to direct or indirect connection or coupling between two or more elements and can include that one or more intermediate element is present between two elements "connected" or "coupled" to each other. The coupling or connecting of elements may be physical, may be logical, or may be a combination thereof. For example, "connection" may be read as "access." In the case of use in the present disclosure, two elements can be considered to be "connected" or "coupled" to each other using at least one of one or more electrical wires, cables, and printed electric connections or using electromagnetic energy or the like having wavelengths in a radio frequency range, a microwave area, and a light (both visible light and invisible light) area as non-restrictive and non-comprehensive examples.

An expression "on the basis of" which is used in the present disclosure does not refer to only "on the basis of only," unless otherwise described. In other words, the expression "on the basis of" refers to both "on the basis of only" and "on the basis of at least."

Any reference to elements having names such as "first" and "second" which are used in the present disclosure does not generally limit amounts or an order of the elements. The terms can be conveniently used to distinguish two or more elements in the present disclosure. Accordingly, reference to first and second elements does not mean that only two elements are employed or that the first element has to precede the second element in any form.

The term "means" in the configuration of each device may be substituted by the term "unit," "circuit," "device," or the like.

In the present disclosure, when the terms "include," "including," and modifications thereof are used, these terms are intended to have a comprehensive meaning similarly to the term "comprising." Further, the term "or" which is used in the present disclosure is intended not to mean an exclusive logical sum.

In the present disclosure, when articles are added by translation like, for example, "a," "an" and "the" in English, the present disclosure may include that nouns that follow these articles are plural forms.

In the present disclosure, an expression "A and B are different" may mean that "A and B are different from each other." Meanwhile, the expression may mean that "A and B are different from C." The terms "separated," "coupled," and the like may also be construed similarly to "different."

REFERENCE SIGNS LIST

1 Recognition error correction device
10 Corpus storage unit
11 Correction model storage unit
12 Restoration model storage unit
20 Pair data creation unit
21 Pair data acquisition unit
22 Correction model generation unit
23 Pseudo error word creation unit
24 Restoration model generation unit
25 Error detection unit
26 Error correction unit

The invention claimed is:

1. A recognition error correction device comprising processing circuitry configured to:
   acquire pair data in which a sentence of a recognition result of voice recognition or character recognition and a label string composed of process labels that are labels indicating a process for correcting a recognition error for each word constituting the sentence are associated with each other; and
   generate a correction model that is a learned model for correcting a recognition error of the recognition result by performing machine learning using the acquired pair data.

2. The recognition error correction device according to claim 1, wherein the processing circuitry performs machine learning using a sequence labeling method.

3. The recognition error correction device according to claim 2, wherein the processing circuitry further configured to create the pair data on the basis of comparison between the sentence of the recognition result and correct answer data of the recognition result,
   wherein the processing circuitry acquires the created pair data.

4. The recognition error correction device according to claim 1, wherein the processing circuitry further configured to create the pair data on the basis of comparison between the sentence of the recognition result and correct answer data of the recognition result,
   wherein the processing circuitry acquires the created pair data.

5. The recognition error correction device according to claim 1, wherein the processing circuitry further configured to detect an error word that is a word of a recognition error included in an input sentence that is a sentence of the recognition result by applying the input sentence to the generated correction model.

6. The recognition error correction device according to claim 5, wherein the processing circuitry further configured to correct a recognition error of the input sentence by performing a process based on the process label which is output for the error word when applied to the correction model with respect to the detected error word.

7. The recognition error correction device according to claim 6, wherein, when the process based on the process label is performed on the error word, the processing circuitry applies the error word to a restoration model that is a learned model generated by performing machine learning using a predetermined word and a pseudo error word obtained by adding an error to the predetermined word, the restoration model restoring an erroneous word to an error-free word.

8. The recognition error correction device according to claim 7, wherein the processing circuitry constructs a word lattice on the basis of the input sentence and the output process label, and corrects a recognition error of the input sentence on the basis of a path of the word lattice.

9. The recognition error correction device according to claim 6, wherein the processing circuitry constructs a word lattice on the basis of the input sentence and the output process label, and corrects a recognition error of the input sentence on the basis of a path of the word lattice.

10. A non-transitory computer readable medium that stores correction model configured to cause a computer to perform a method comprising:
  acquiring pair data in which a sentence of a recognition result of voice recognition or character recognition and a label string composed of process labels that are labels indicating a process for correcting a recognition error for each word constituting the sentence are associated with each other; and
  generating a correction model that is a learned model for correcting a recognition error of the recognition result by performing machine learning using the acquired pair data.

* * * * *